Nov. 6, 1951
G. E. BROWN ET AL
2,574,432
INSTRUMENT FOR MEASURING OR INDICATING
THE SPECIFIC GRAVITY OF LIQUIDS
Filed Sept. 17, 1945
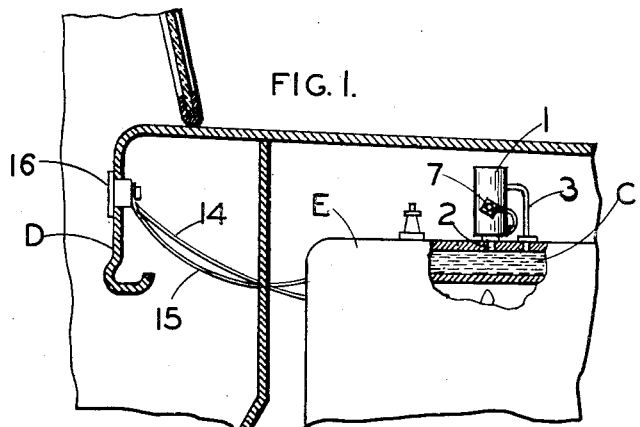
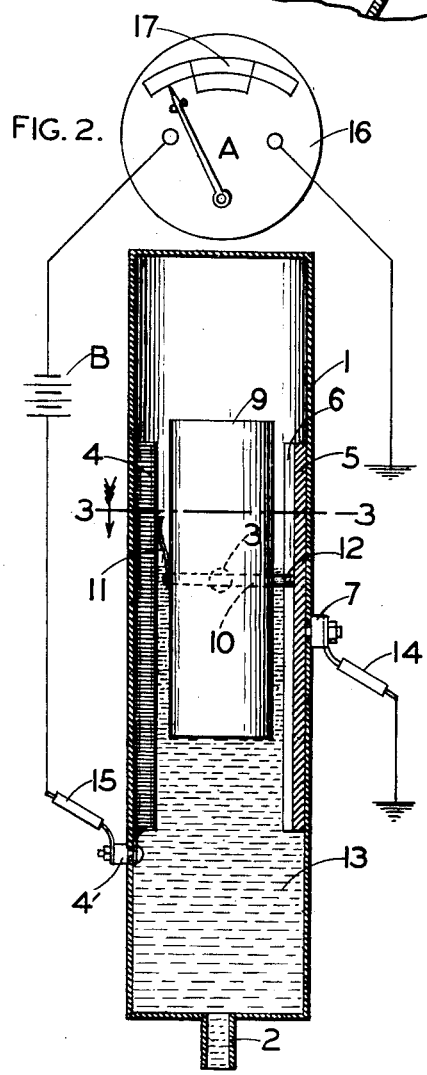
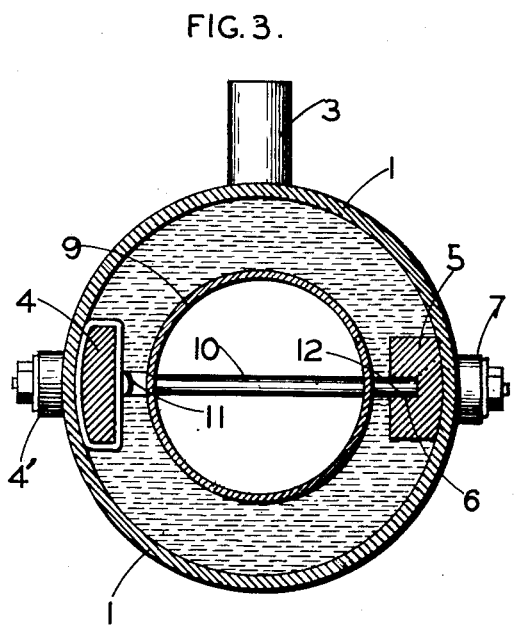
Inventor
GUY E. BROWN
BYRON K. MACEY
By Mason Fenwick & Lawrence
Attorneys Patented Nov. 6, 1951

2,574,432

UNITED STATES PATENT OFFICE 2,574,432

INSTRUMENT FOR MEASURING OR INDICATING THE SPECIFIC GRAVITY OF LIQUIDS

Guy E. Brown and Byron K. Macey,
Burlington, Vt.

Application September 17, 1945, Serial No. 616,702

1 Claim. (Cl. 73—33)

This invention relates to an instrument for measuring or indicating the specific gravity of liquids.

More particularly, the invention relates to a device for measuring or indicating the density of the liquid in the circulatory cooling system of an automobile engine, after the same has been fortified with an anti-freeze preparation so that the driver of an automobile can be always advised as to the strength of the anti-freeze solution.

The object of the invention is to provide a simple and reliable instrument which can be easily applied to an automobile and which can be efficiently manufactured with a minimum of movable parts to assure efficient operation under normal driving conditions.

The invention consists in the novel construction arrangement and combinations of parts as hereinafter more particularly described and claimed.

One sheet of drawings accompanies this specification as part thereof in which like reference characters indicate like parts throughout.

In the drawings:

Fig. 1 is a fragmentary diagrammatic vertical cross section through the dash board and hood of a conventional automobile illustrating the present invention applied.

Fig. 2 is a vertical cross sectional view taken through the improved device in circuit with a diagrammatic representation of an ammeter.

Fig. 3 is a horizontal cross section taken on line 3—3 of Fig. 2.

In accordance with the present invention, a container 1 is provided herein illustrated as being of substantially cylindrical shape and preferably formed of some non-conductive, non-corrosive plastic, this container being provided with a bottom outlet associated with a tube 2, and an outlet intermediate its bottom and top associated with a tube 3 by means of which tube a constant height of liquid can be maintained in the container 1.

Positioned within the container 1 is a vertically disposed resistance coil 4 associated with a binding post 4' and oppositely disposed from the resistance coil 4 is positioned a conductor guide member 5 formed with a vertically disposed slot 6 and connected with a binding post 7.

Within the container is a float 9 of less length than the container and capable of vertical movement within the container. This float 9 is provided with a diametrically disposed conductor member 10 electrically connected at the end adjacent the resistance coil 4 with a contact member 11 and having its opposite end 12 extended beyond the float 9 to slidingly engage the slot 6 in the conductor guide member 5.

The binding posts 4 and 7 are connected with conductors 14 and 15 forming a circuit with a suitable source of current B through the ammeter 16 which may be of any improved type provided with a calibrated scale 17 to conform with gradations in the specific gravity of the liquid being passed through the container 1 in the bottom portion 13 thereof as reflected by the variations of the float 9 determined by its buoyancy in the liquid as the specific gravity of the liquid varies.

The container 1 will be suitably associated with the circulatory cooling system C of the engine E by connecting the tubes 2 and 3 in communication with such circulatory system and the conductors 14 and 15 will extend to the ammeter 16 maintained upon the dash board D.

With the instrument thus arranged, it will be apparent that the driver of the automobile can be at all times advised of the strength of the anti-freeze solution in the circulatory system of the engine.

Various modifications in the precise construction and arrangement of the parts will readily suggest themselves to those skilled in the art but within the scope of the present invention as claimed.

Having thus fully described our invention, we claim:

Instrument for measuring the specific gravity of a liquid consisting of a container of insulating material having conduits communicating said container from points adjacent its bottom and medial its top and bottom to a reservoir of the liquid to be tested, a resistance coil positioned vertically within the container and against one side wall, a conductive guide element having a longitudinally extending groove, said guide positioned within the container against the opposite wall with said groove confronting the coil, both said coil and guide rod positioned to extend above and below the medial conduit, a float in the container, a conductive rod extending diametrically through the float with one end slidingly positioned in the groove of the guide member, a resilient contact finger mounted on the opposite end of said rod engaging the resistance coil and an ammeter in circuit with said coil contact finger, conductor rod, guide rod and a source of electric current.

GUY E. BROWN.
BYRON K. MACEY.

REFERENCES CITED

The following references are of record in the file of this patent:

UNITED STATES PATENTS

| Number | Name | Date |
|---|---|---|
| 1,878,801 | Perkins | Sept. 20, 1932 |
| 2,002,184 | Lecarpentier | May 21, 1935 |
| 2,045,970 | Stein | June 30, 1936 |
| 2,125,219 | Campbell | July 26, 1938 |
| 2,147,500 | Rothenberger et al. | Feb. 14, 1939 |